United States Patent [19]

Morrow

[11] 4,102,081

[45] Jul. 25, 1978

[54] PLANT CONTAINER

[76] Inventor: Edwin M. Morrow, Rte. 1, Brevard, N.C. 28712

[21] Appl. No.: 768,110

[22] Filed: Feb. 14, 1977

[51] Int. Cl.² ............................................. A01G 9/02
[52] U.S. Cl. ........................................ 47/67; 47/83
[58] Field of Search .................. 47/14, 66, 67, 68, 71, 47/79, 90, 81, 82, 83

[56] References Cited

U.S. PATENT DOCUMENTS

| 52,200 | 1/1866 | Prince | 47/67 |
|---|---|---|---|
| 354,416 | 12/1886 | Heisey | 47/67 |
| 620,150 | 2/1899 | Kitchen | 47/67 |
| 1,077,423 | 11/1913 | Myers | 47/67 |
| 1,538,081 | 5/1925 | Bank | 47/67 X |
| 1,572,548 | 2/1926 | Mattison | 47/67 |
| 2,605,588 | 8/1952 | Lindstaedt | 47/67 |
| 3,555,729 | 1/1971 | Chute | 47/81 |
| 3,686,791 | 8/1972 | Mills | 47/82 |
| 3,739,523 | 6/1973 | Tuffli | 47/81 |
| 3,950,637 | 4/1976 | Rodin | 47/67 X |
| 3,965,614 | 6/1976 | Kienholz | 47/14 |

FOREIGN PATENT DOCUMENTS 1,267,541  3/1972  United Kingdom ............. 47/67

OTHER PUBLICATIONS

Kramer, Jack, 1971, *Hanging Gardens*, cited illustrations, "Hanging Planters", Hanging Planters–Tiered and Planter–Wall Mounted, pub. Charles Scribnerssons, N.Y.

Primary Examiner—Edgar S. Burr
Assistant Examiner—James R. Feyrer
Attorney, Agent, or Firm—Wellington M. Manning, Jr.; Luke J. Wilburn, Jr.

[57] ABSTRACT

An improved plant and flower container of the hanging type comprising a pot having a removable false bottom to provide a compartment for collecting and storing excess water for subsequent absorption by the plant, a single hanging rod removably attachable to the central bottom portion of the pot for hanging support thereof, and means on the central axis of the pot beneath the bottom surface thereof for supportably receiving the hook portion of another plant container hanging rod whereby a plurality of such containers may be supported in compact, vertically spaced relation during plant growth. Several embodiments of the plant container are disclosed and the containers are so designed as to be readily stored in compact, nested relation prior to use, and may be quickly and easily assembled to be used in greenhouse and home to provide a compact aesthetically attractive arrangement of hanging plant containers.

1 Claim, 5 Drawing Figures

PLANT CONTAINER

This invention relates to a plant container and, more particularly, to an improved hanging pot construction for flowers, plants, and the like.

OBJECTS OF THE INVENTION

It is an object of this invention to provide an improved hanging flower pot construction for use in greenhouses, as well as in homes, to contain plants and flowers during their growth.

It is another object of this invention to provide a plant container which eliminates the need for a separate saucer or pan beneath the container to catch and hold excess water to be absorbed by a plant in the container.

It is a further object to provide a hanging container construction for plants which permits a plurality of such containers to be hung in compact, vertically spaced relation for the growing of plants and flowers in a greenhouse, as well as permitting an aesthetically attractive arrangement of such containers for the display of plants and flowers by a purchaser.

It is another object to provide an improved hanging plant container having a single centrally located hanger rod which minimizes interference with plant growth outwardly of the walls of the container.

It is another object to provide a hanging plant container which is so constructed that a plurality of such containers may be compactly stored in disassembled condition, and may be quickly and easily assembled for greenhouse or home use.

It is another object to provide an improved flower pot construction which may be conveniently and economically molded from plastic.

BRIEF DESCRIPTION OF THE DRAWINGS

The above as well as other objects of the present invention will become more apparent and the invention will be better understood from the following detailed description of preferred embodiments of the invention, when taken together with the accompanying drawings, in which.

DETAILED DESCRIPTION OF PREFERRED EMBODIMENTS

Figure 1:
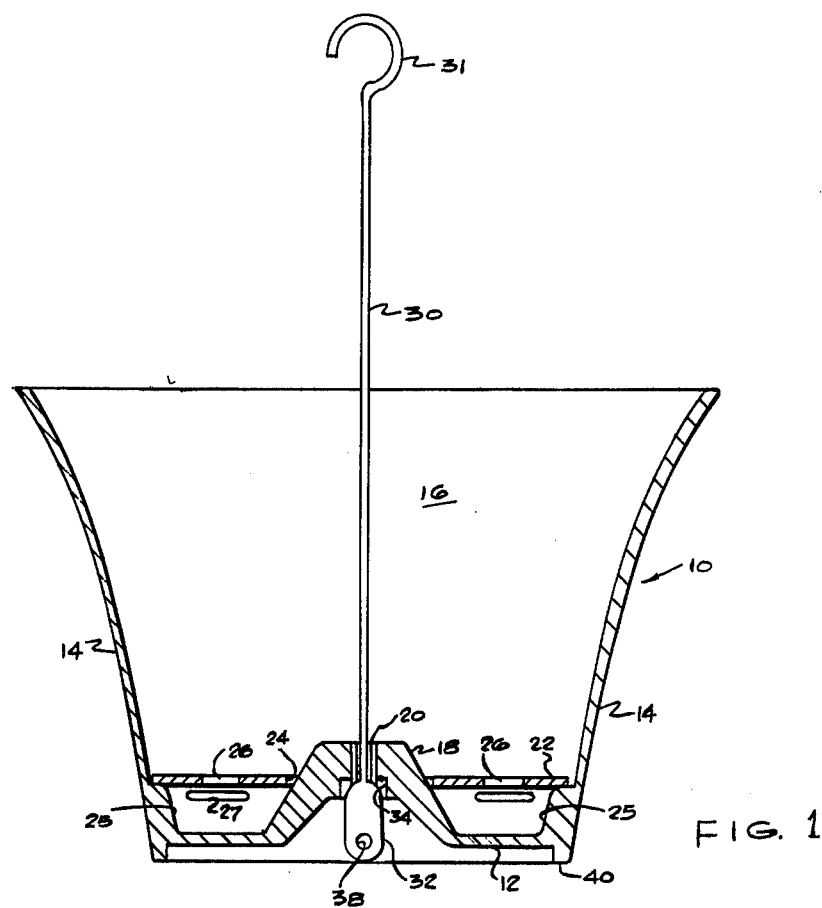
FIG. 1 is a sectional elevation view of a hanging plant container of the present invention.
Figure 2:
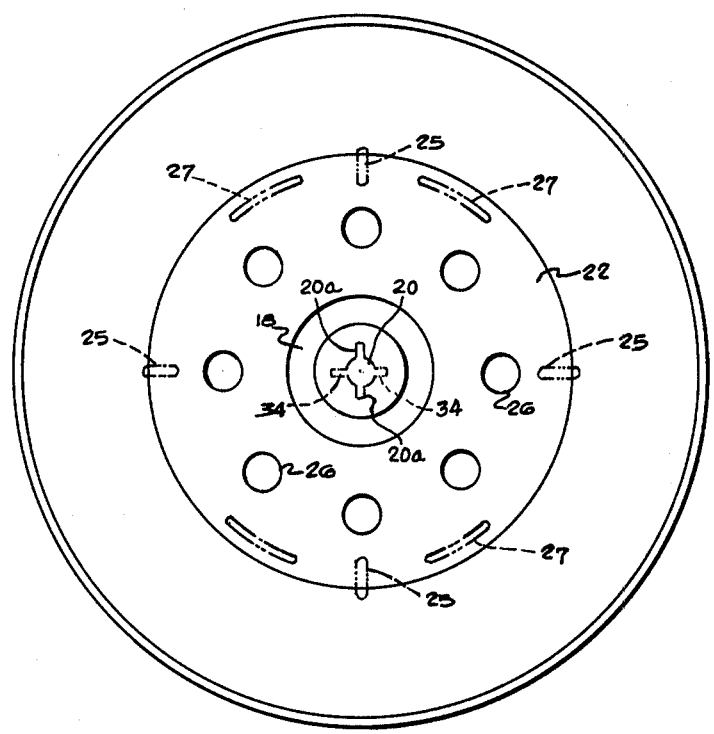
FIG. 2 is a plan view of the container of FIG. 1, with the hanging rod removed therefrom.

Referring more particularly to the drawings, in the preferred embodiment shown in FIGS. 1 and 2, the plant container of the present invention comprises a pot 10 having bottom 12 and side walls 14 defining an open top cavity 16 for containing planting soil, dirt, or the like. As seen in FIG. 2, the pot is generally circular in horizontal section. Extending upwardly from the central portion of bottom wall 12 of the pot is a generally frustoconical projection 18, the central axis of which coincides with the central vertical axis of the pot. Coextensive with the central axis of the pot and projection is a vertical opening or passageway 20 which extends from the upper surface of the projection 18 through the bottom wall 12 of the pot.

Removably supported above bottom wall 12 of the pot in vertically spaced relation thereto, is a generally circular plate 22 which has a central opening 24 for receiving the frustoconical projection 18. The plate 22 is maintained in parallel spaced relation from the bottom wall of the pot by engagement with a plurality of upstanding elements 25 (FIGS. 1 and 2) spaced about the inner periphery of the bottom wall and extending upwardly along the side walls to form shoulder means on which the peripheral edge of plate 22 rests. Plate 22 has a plurality of openings 26 which permit passage of water from the upper portion of cavity 16 into the lower portion below the plate. The side walls 14 of the pot are provided with a plurality of narrow, horizontal slots 27 located just below plate 22 so that during a watering operation, excess water can pass from the pot to avoid oversaturation of the soil and plant above the plate. Plate 22 thus serves as a false bottom in the pot to provide a lower compartment which collects and stores excess water from the soil above the plate without the necessity of a separate saucer or container often used for this purpose.

As shown in FIG. 1, the central axis of pot 10 is supported in vertically disposed relation by means of a hanging rod 30 of substantially rigid construction. The upper end of the rod is provided with a hook portion 31 and the lower end 32 of the rod extends through the passageway 20 and through the bottom wall 12 of the pot. As best seen in FIG. 2, passageway 20 includes a central circular portion and a transverse keyway portion 20a. The undersurface of the bottom wall of the pot is provided with a shallow groove 34 (shown in broken lines in FIG. 2), the axis of which is disposed at a right angle to the axis of keyway portion 20a. In the embodiment shown in FIGS. 1 and 2, the lower end 32 of the hanging rod is flattened and of a size to pass through the keyway portion of the opening and beyond the bottom wall of the container. By rotating the rod 90° about its longitudinal axis after the flattened end portion has been passed through the passageway 20, the upper edge of the flattened portion 32 is brought to reside in the shallow groove 34 to support the pot on the rod with its central axis disposed generally vertically, as seen in FIG. 1.

The lower end of the flattened portion 32 of the rod further is provided with an opening 38, which is adapted to receive the hook portion of a corresponding hanging rod of another plant container of the type shown in FIGS. 1 and 2. Thus, a plurality of such plant containers, as described, can be supportably hung in closely spaced, vertical relation. As seen in FIG. 1, the bottom wall 12 of the container is recessed upwardly into the frustoconical projection such that the flattened lower portion of the hanging rod, when positioned in engagement with the pot, does not extend below the lower peripheral rim 40 of the pot. With this arrangement, the pot may be lifted from a hanging position and placed on a flat surface without the hanging rod contacting the surface, thereby providing for level support of the pot whether in hanging position or on a flat surface on its base. In addition, the recess under the frustoconical projection facilitates the compact storage of the pot when not in use. A plurality of the pots, with the hanging rods removed, may be conveniently nested within each other for compact storage prior to use.

Figure 3:
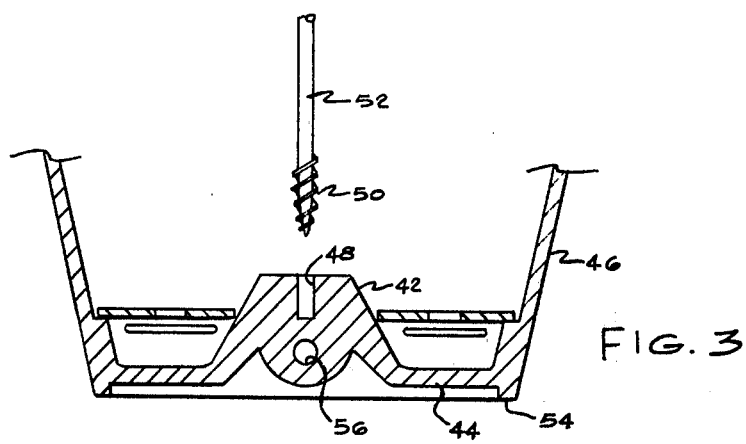
FIG. 3 is a sectional elevation view of a modified form of hanging plant container of the present invention, the upper portion of the container being broken away for convenience.

FIG. 3 shows a modified form of the plant container of the present invention wherein the frustoconical projection 42 extending upwardly from the bottom 44 of the pot 46 is provided with a vertical passage 48 which does not extend through the bottom wall of the pot, but is adapted to receive the screw-threaded end 50 of a hanging rod 52 therein. Recessed above the peripheral rim 54 of the bottom of the pot below the frustoconical projection 42 is means defining an opening 56 through which the hook portion of a hanging rod of another pot may be supportably positioned to space the pots in vertical relation.

Figure 4:
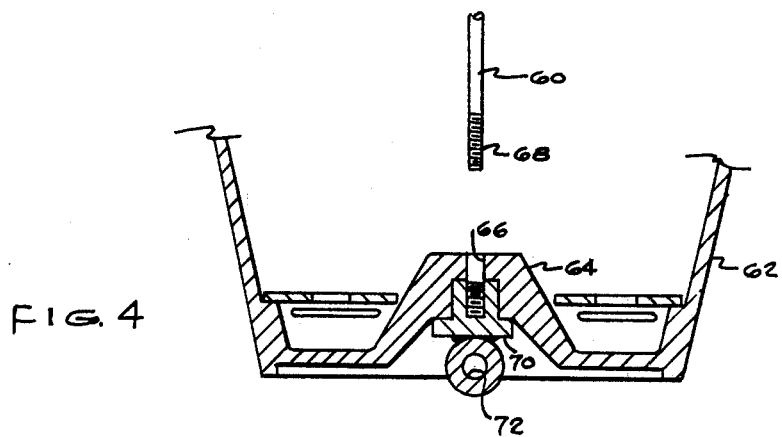
FIG. 4 is a sectional elevation view of a further modified form of plant container of the present invention, the upper portion being broken away for convenience.

In the embodiment of the invention shown in FIG. 4, a hanging rod 60 is removably attached to the pot 62 in another manner. Frustoconical projection 64 has a vertical passageway 66 therethrough, and the end 68 of the hanging rod is threaded so as to be secured to the pot by means of a internally threaded nut member 70, the lower portion of which is provided with an eyelet or opening 72 to supportably receive the hook portion of a hanging rod of another pot.

Figure 5:
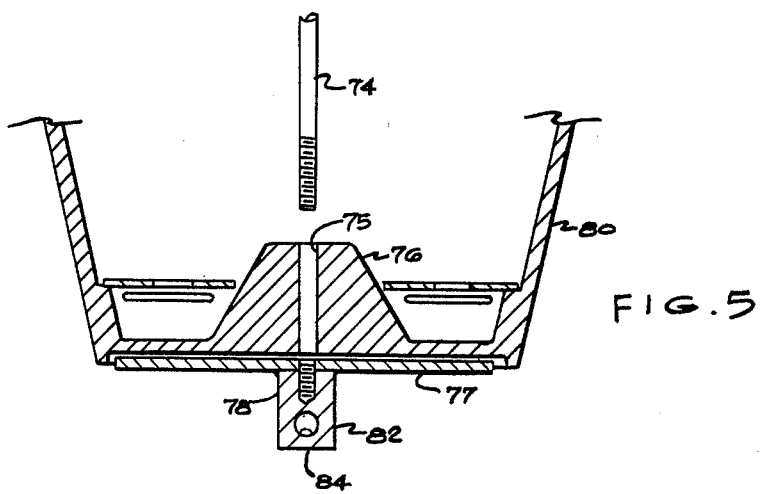
FIG. 5 is a sectional elevation view of still another modified form of plant container of the present invention, the upper portion of same being broken away for convenience.

In the embodiment shown in FIG. 5, the threaded end of a hanging rod 74 passes through the central vertical passageway 75 in the upstanding projection 76 and bottom wall and is secured to a flat plate 77 having an internally threaded opening 78 to support the pot 80. The plate is provided with a projection 82 having an opening 84 for receiving the hook portion of another hanging rod of a container construction of the type described herein.

In all the embodiments shown in FIGS. 1–5, the pots may readily be molded from plastic material, and easily stacked in compact nested relation, with the hanging rods removed therefrom, until use.

Thus it can be seen that in the embodiments of the present invention shown and described herein, the hanging pot construction of the present invention provides a unique arrangement for containing plants and flowers wherein the pots have a removable false bottom to provide for storage of excess water, and wherein the pots may be hung in vertical, closely spaced relation by means of a single central hanging rod which may be easily attached to and removed from the pot to facilitate storage and ready assembly of the pots for use in greenhouse locations.

That which is claimed is:

1. A plant container comprising a pot having bottom and side walls defining an open top cavity, a projection extending centrally upwardly in said cavity in the bottom portion thereof, a passageway extending along the central axis of the pot and through the bottom wall of the pot and having an opening in the upper surface of said projection, said passageway including a transverse keyway portion extending through said bottom wall, the undersurface of said pot adjacent the lower opening of said passageway having groove means arcuately displaced about the axis of said passageway from said keyway portion, a generally flat plate, means in said pot cavity for supporting said plate in spaced relation above said bottom wall to form a false bottom in said cavity, a hanging rod for said pot, the lower end of said hanging rod comprising a flattened portion having side edges receivable in said keyway portion of said passageway during passage of said hanging rod therethrough, and being receivable in said groove means on the undersurface of said pot when rotated about the axis of said passageway whereby upper edge portions of said flattened portion of said hanging rod are received in said groove means to supportably suspend the pot on said rod when the central axis of the rod is substantially vertical, and means on the lower end of said rod defining an opening for supportably receiving the upper end of another hanging rod therein whereby a plurality of said containers may be supported in vertically spaced hanging relation.

* * * * *